(12) United States Patent
Ecklund et al.

(10) Patent No.: US 8,259,302 B2
(45) Date of Patent: Sep. 4, 2012

(54) VARIABLE PATH LENGTH CONTROL MODULATION FREQUENCY

(75) Inventors: Steven P. Ecklund, St. Anthony, MN (US); Stephen M. Baker, Roseville, MN (US); Craig A. Galbrecht, Lino Lakes, MN (US)

(73) Assignee: Honeywell International Inc., Morristown, NJ (US)

( * ) Notice: Subject to any disclaimer, the term of this patent is extended or adjusted under 35 U.S.C. 154(b) by 277 days.

(21) Appl. No.: 12/847,119

(22) Filed: Jul. 30, 2010

(65) Prior Publication Data

US 2012/0026502 A1 Feb. 2, 2012

(51) Int. Cl.
*G01C 19/68* (2006.01)
(52) U.S. Cl. .................................. 356/473; 356/475
(58) Field of Classification Search ........... 356/472–476
See application file for complete search history.

(56) References Cited

U.S. PATENT DOCUMENTS

| | | | |
|---|---|---|---|
| 4,152,071 A | 5/1979 | Podgorski | |
| 4,344,706 A | 8/1982 | Ljung et al. | |
| 4,370,583 A | 1/1983 | Ljung | |
| 4,533,248 A | 8/1985 | Baumann | |
| 4,653,919 A | 3/1987 | Stjern et al. | |
| 4,751,718 A | 6/1988 | Hanse et al. | |
| 4,795,259 A * | 1/1989 | Egli et al. ................ | 356/473 |
| 4,826,320 A | 5/1989 | Callaghan et al. | |
| 4,899,346 A * | 2/1990 | Perkins .................... | 372/32 |
| 4,933,592 A | 6/1990 | Priddy | |
| 4,981,359 A | 1/1991 | Tazartes et al. | |
| 5,108,182 A | 4/1992 | Murphy | |
| 5,225,889 A | 7/1993 | Fritze et al. | |
| 5,233,406 A | 8/1993 | Platt et al. | |
| 5,249,031 A | 9/1993 | Fritze et al. | |
| 5,400,141 A | 3/1995 | Albers et al. | |
| 5,406,369 A | 4/1995 | Killpatrick et al. | |
| 5,450,198 A | 9/1995 | Killpatrick et al. | |

(Continued)

FOREIGN PATENT DOCUMENTS

GB   2062950   11/1980

OTHER PUBLICATIONS

European Patent Office, "European Search Report", "Received Jan. 12, 2012 from EP counter part", mailed Nov. 7, 2011, Published in: EP.

(Continued)

*Primary Examiner* — Hwa Lee
(74) *Attorney, Agent, or Firm* — Fogg & Powers LLC

(57) ABSTRACT

A gyroscope system comprises a gyroscope block having a plurality of cavities and a plurality of passages that define a path; a plurality of mirrors each located in one of the plurality of cavities; at least one mirror drive coupled to one of the plurality of mirrors and configured to change a position of the respective mirror, wherein the path's length is changed by the change in the position of the respective mirror; a dither system coupled to the gyroscope block and configured to induce an angular rotation of the gyroscope block; and a controller configured to provide a dither signal indicative of a dither frequency to the dither system and a path length control (PLC) signal indicative of a PLC frequency to the at least one mirror drive. The controller is configured to calculate the PLC frequency as a function of the dither frequency.

20 Claims, 3 Drawing Sheets

U.S. PATENT DOCUMENTS

| | | |
|---|---|---|
| 5,451,947 A | 9/1995 | Morrison |
| 5,774,216 A | 6/1998 | Priddy et al. |
| 5,801,377 A | 9/1998 | Karpinski, Jr. et al. |
| 5,854,677 A | 12/1998 | Aronowitz et al. |
| 6,208,414 B1 | 3/2001 | Killpatrick et al. |
| 6,354,964 B1 | 3/2002 | Galbrecht et al. |
| 6,476,918 B1 | 11/2002 | Killpatrick |
| 6,683,692 B2 | 1/2004 | McClary et al. |
| 7,375,816 B2 | 5/2008 | Schober |

OTHER PUBLICATIONS

Oelschlaeger et al., "GG1308 Ring Laser Gyro Inertial Measurement Systems: Honeywell's Low Cost Solution for Tactical Applications", "Military Avionics Division", Mar. 20, 1990, pp. 528-536, Publisher: Honeywell Inc.

European Patent Office, "Office Action", Mar. 26, 2012, Published in: EP.

\* cited by examiner

VARIABLE PATH LENGTH CONTROL MODULATION FREQUENCY

BACKGROUND

Ring laser gyros (RLGs) are instruments used to measure angular rotation. They include a cavity in which two laser beams travel in counter-rotating (i.e., opposite) directions. The laser beams create an optical interference pattern having characteristics representative of the amount by which the RLG is rotated. The interference pattern is detected and processed to provide the angular rotation measurements.

RLGs are subject to a phenomenon known as "lock-in" which can degrade their measurement accuracy. One known approach for minimizing lock-in is dithering. Dithering is the mechanical oscillation of the RLG. This function is provided by a dither system which includes a motor for generating the oscillations, and a transducer for generating a signal known as the dither pick-off which is representative of the dither motion amplitude and frequency. RLGs also typically include a path length control (PLC) system which adjusts the path length of the laser beams within the RLG cavity to maintain peak steady state intensity/power.

SUMMARY

In one embodiment, a gyroscope system is provided. The gyroscope system comprises a gyroscope block having a plurality of cavities and a plurality of passages that define a path; a plurality of mirrors each located in one of the plurality of cavities; at least one mirror drive coupled to one of the plurality of mirrors and configured to change a position of the respective mirror, wherein the path's length is changed by the change in the position of the respective mirror; a dither system coupled to the gyroscope block and configured to induce an angular rotation of the gyroscope block; and a controller configured to provide a dither signal indicative of a dither frequency to the dither system and a path length control (PLC) signal indicative of a PLC frequency to the at least one mirror drive. The controller is configured to calculate the PLC frequency as a function of the dither frequency.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
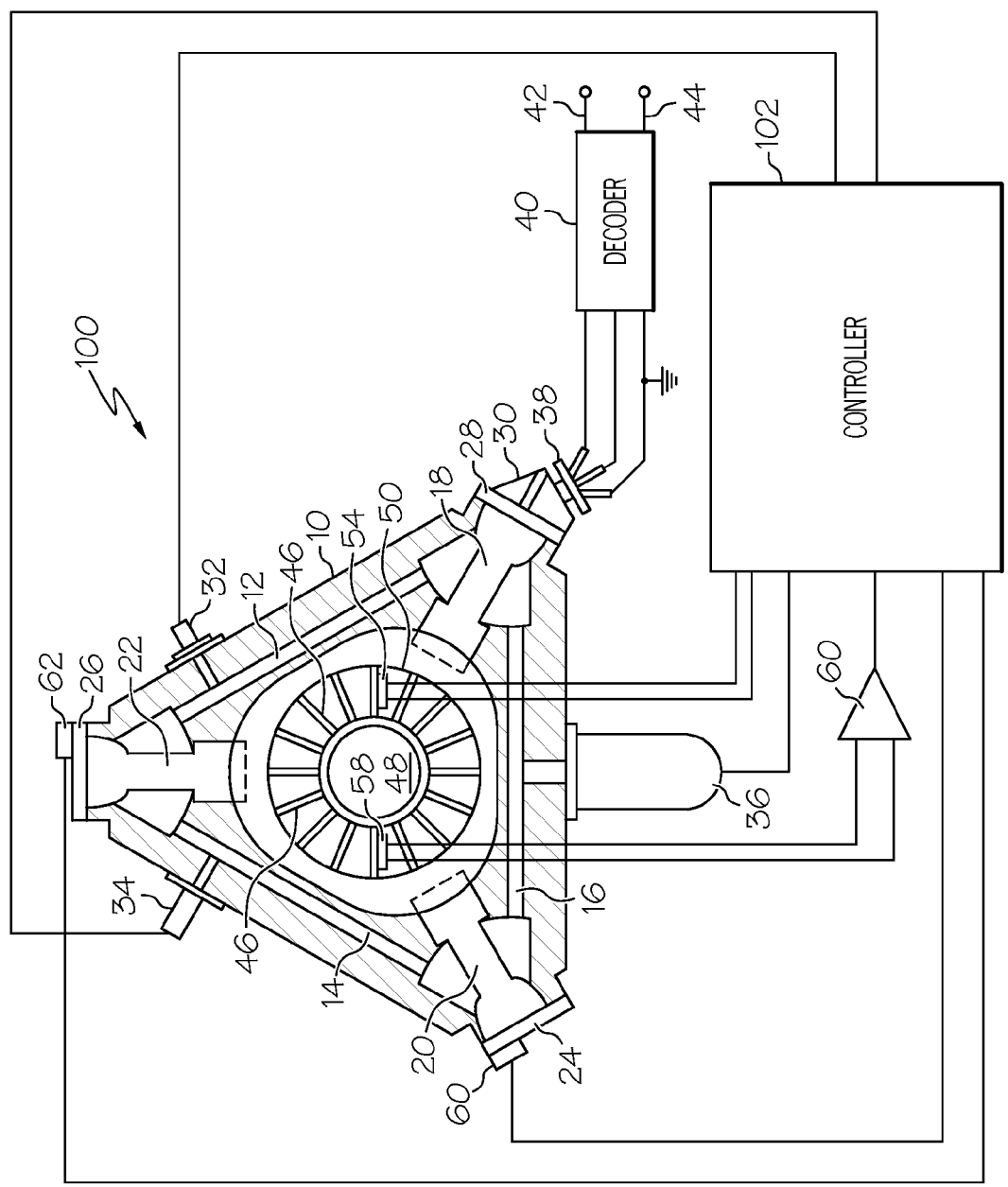
FIG. 1 is a block diagram of one embodiment of gyroscope system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of a gyroscope system 100. Gyroscope system 100 includes a gyroscope block 10. In this embodiment, the gyroscope block 10 is a thermally and mechanically stable triangularly-shaped glass-ceramic block. However, it is to be understood that, in other embodiments, other shapes and materials can be used. The gyroscope block 10 contains a plurality of passages 12, 14, and 16 which in turn contain a gas mixture, such as helium-neon. A cavity 18 interconnects the passages 12 and 16, a cavity 20 interconnects the passages 14 and 16, and a cavity 22 interconnects the passages 12 and 14 to form a continuous cavity. The gyroscope block 10 also includes mirrors 24 and 26 positioned adjacent to and in communication with the cavities 20 and 22, respectively. A partially transmissive output mirror 28 is positioned adjacent to and in communication with the cavity 18. The mirrors 24, 26, and 28 direct clockwise and counterclockwise traveling laser beams within the glass ceramic block 10 as described in further detail below. A beam combiner 30 is coupled to the partially transmissive output mirror 28.

A first anode 32 is mounted on the glass ceramic block 10 between the cavities 18 and 22 and is in communication with the passage 12. A second anode 34 is similarly mounted on the glass ceramic block 10 between the cavities 20 and 22 and is in communication with the passage 14. A cathode 36 is mounted on the glass ceramic block 10 between the cavities 18 and 20 and is in communication with the passage 16. A controller 102 electrically energizes the first and second anodes 32 and 34 and the cathode 36 which results in lasing of the gas mixture to establish clockwise and counterclockwise laser beams within the passages 12, 14, and 16 and the cavities 18, 20, and 22.

The clockwise and counterclockwise laser beams are reflected by the mirrors 24, 26, and 28, and are partially transmitted through the partially transmissive output mirror 28. The portions of the clockwise and counterclockwise laser beams which are transmitted through the partially transmissive output mirror 28 are combined by the beam combiner 30 and are then directed onto a photodetector 38. The output of the photodetector 38 is decoded by a conventional logic decoder 40 which provides either a pulse on an output line 42 representing clockwise rotation of the glass ceramic block 10, or a pulse on an output line 44 representing counterclockwise rotation of the glass ceramic block 10.

Gyroscope system 100 also includes a dither system. In this embodiment, the dither system is implemented with radial torsion springs or spokes 46 which are mounted between a central support member or hub 48 and a toroidal rim 50. The hub 48 can be securely attached to an inertial platform, and the toroidal rim 50 is, in turn, in frictional contact with the gyro block 10.

At least one piezoelectric actuator 54 is affixed to at least one of the spokes 46. A modulation voltage signal provided by the controller 102 is then applied to the piezoelectric actuator 54 such that a torsional stress is imparted to the at least one spoke 46 causing the at least one spoke 46 to flex. Flexure of the at least one spoke causes rotational motion of the toroidal rim 50 and the gyro block 10 relative to the hub 48. The frequency of the modulation voltage is also referred to herein as the dither frequency.

In addition, at least one piezoelectric transducer 58 is attached to another one of the spokes 46. The mechanical oscillation of the spokes 46 constitutes dither and is detected by the piezoelectric transducer 58. The output of the piezoelectric transducer 58 is coupled to an amplifier 60. The amplifier 60 generates an output signal indicative of angular rotation of the gyroscope due to the dithering. The signal output from the amplifier 60 is provided to the controller 102. The controller 102 then determines the dither-induced angular rotation of the gyroscope based on the output of the amplifier 60. In particular, the controller 102 compares the amplifier output with some fixed reference point when the gyro block 10 is at rest. The amplifier output signal is also referred to herein as the dither angle signal.

It is to be understood that the dither system shown in FIG. 1 is provided by way of example and not by way of limitation. For example, another exemplary dither system suitable for use in the gyroscope system 100 is described in U.S. Pat. No. 4,751,718 which is incorporated herein by reference. Furthermore, additional exemplary embodiments of gyroscopes implementing dither systems are described in detail in U.S. Pat. Nos. 6,476,918; 5,225,889; 5,249,031; 5,406,369; and 4,533,248 entitled DITHER CONTROL SYSTEM FOR A RING LASER GYRO, LASER GYRO DITHER DRIVE, RING LASER GYRO DITHER STRIPPER, LASER GYRO MICROPROCESSOR CONFIGURATION AND CONTROL, and RING LASER GYROSCOPE, respectively, all of which are incorporated herein by reference. Thus, other suitable dither systems known to one of skill in the art are used, in other embodiments, in place of the dither system discussed above.

The gyroscope system 100 also includes a path length control (PLC) system. In the example shown in FIG. 1, the PLC system includes two mirror drives 60 and 62 each coupled to the back of one of the mirrors 24, and 26, respectively. In this exemplary embodiment, the mirror drives 60, and 62 are implemented as piezoelectric transducers (PZT). The thickness of the PZT 60, and 62 is controlled by a modulation voltage signal which is provided to each PZT by the controller 102. In some embodiments, as the voltage is increased, the thickness of the corresponding PZT is decreased. Decreasing the thickness of the PZT in turn increases the path length since each PZT is on the back of a respective mirror. In such embodiments, decreasing the voltage increases the thickness which in turn decreases the path length. However, it is to be understood that the voltage polarity, PZT position, and PZT operation may be reversed in other embodiments. For example, each PZT can be configured to increase in thickness with increasing voltage and vice versa. The frequency of the modulation voltage signal provided by the controller 102 to PZT 60 and 62 is also referred to herein as the PLC modulation frequency. The modulation voltage signal can be implemented as a sinusoidal, square wave, triangle wave, sawtooth signal, etc.

It is to be understood that the PLC system described herein is provided by way of example and not by way of limitation. In particular, other PLC systems can be used in other embodiments. For example, U.S. Pat. Nos. 6,354,964; 4,152,071; and 5,400,141 each describe exemplary PLC systems which can be suitably used in the gyroscope system 100. Each of U.S. Pat. Nos. 6,354,964; 4,152,071; and 5,400,141 entitled SINGLE BEAM SIGNAL BLANKING FOR ENHANCED PATH LENGTH CONTROL IN A RING LASER GYRO, CONTROL APPARATUS, and METHOD AND SYSTEM FOR MINIMIZING ANGULAR RANDOM WALK OR BIAS IN A RING LASER GYROSCOPE THROUGH THE USE OF TEMPERATURE BASED CONTROL, respectively, are incorporated herein by reference.

The controller 102 is configured to adjust or set the PLC modulation frequency based on the dither frequency to mitigate the effects of the PLC modulation frequency beating with the dither frequency. In particular, the PLC modulation frequency is adjusted such that the beat frequency either does not occur or occurs at a high enough frequency that the performance of the gyroscope system 100 is substantially unaffected by the beat frequency. In some embodiments, the dither frequency is determined based on the dither angle signal. In some such embodiments, the PLC modulation frequency is adjusted in real-time based on variations in the detected dither frequency. In other embodiments, the PLC modulation frequency is selected once based on the detected dither frequency and is not periodically updated.

Additionally, in some implementations, the dither frequency is obtained from a memory device which has stored thereon the dither frequency to be used by the controller 102. In such embodiments, the PLC modulation frequency is adjusted based on the dither frequency stored in memory rather than on a detected dither frequency.

Additionally, the PLC modulation frequency is adjusted as a continuous function of the dither frequency in some implementations. In some such embodiments, the PLC modulation frequency is a fixed multiple of the dither frequency. In particular, in one exemplary embodiment, the PLC modulation frequency is adjusted to be 5.5 times the dither frequency. In other embodiments, the controller 102 adjusts the PLC modulation frequency using a finite number of discrete levels based on the dither frequency. For example, in some embodiments, a fixed number of dither frequencies are used. In such embodiments, a discrete level is correlated with one of the dither frequencies. Thus, if three separate dither frequencies are available, there are three PLC modulation frequencies, each associated with one of the dither frequencies.

Figure 2:
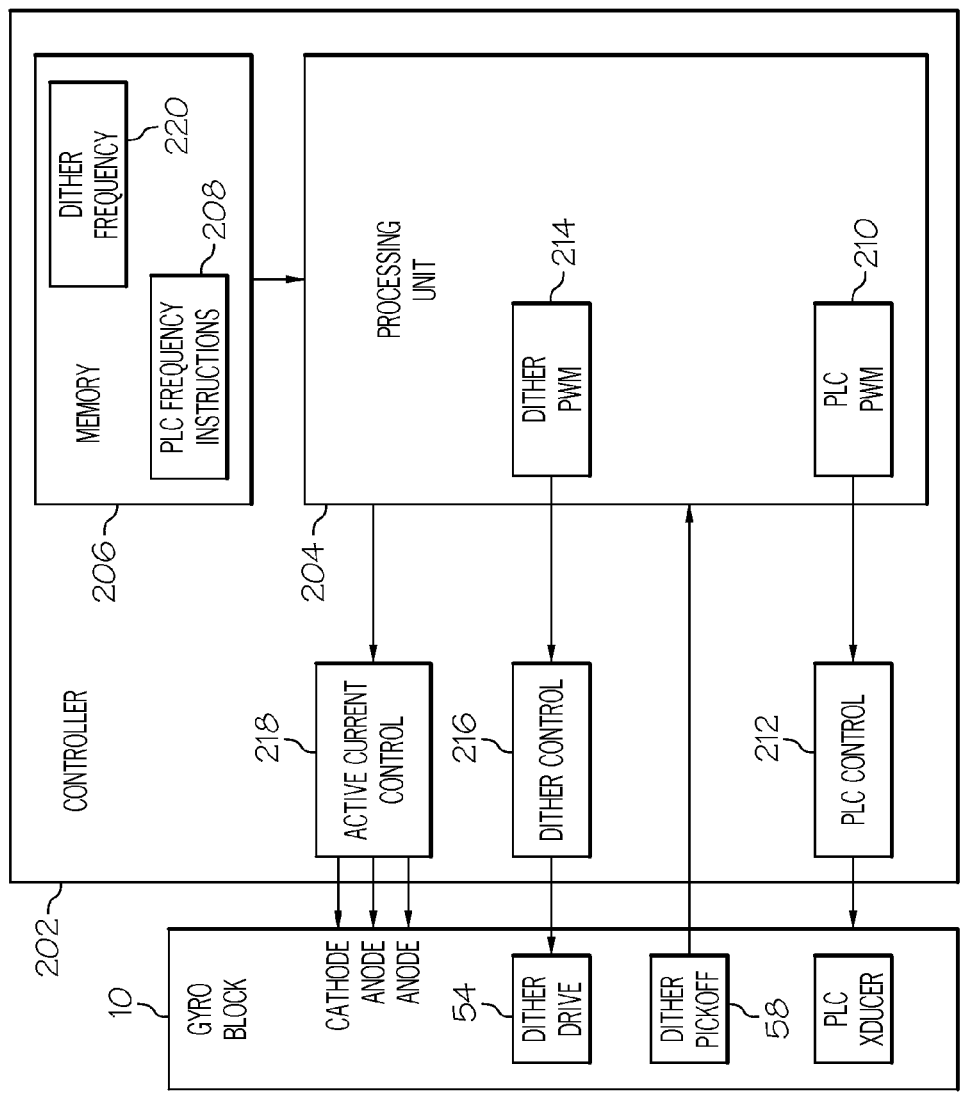
FIG. 2 is a simplified block diagram depicting an exemplary embodiment of a controller in a gyroscope system.

The controller 102 can be implemented using hardware, software, firmware, or any combination thereof. For example, in some embodiments, the controller 102 is implemented using analog circuits known to one of skill in the art to adjust the PLC modulation frequency as a fixed multiple of the dither frequency. In other embodiments, digital circuits involving a processing unit executing an algorithm are used. For example, FIG. 2 is a simplified block diagram depicting an exemplary embodiment of a controller 202 implemented using digital logic.

The controller 202 includes a processing unit 204 and a memory 206. The processing unit 204 also controls the lasing of the gas mixture inside the continuous cavity of the gyro block 10. In particular, the processing unit 204 outputs a signal to the active current control 216. Based on the signal from the processing unit 204, the active current control outputs current to the anodes and cathode to cause the discharge of the gas mixture as described above.

The processing unit 204 includes or functions with software programs, firmware or other computer readable instructions for carrying out various methods, process tasks, calculations, and control functions, used in adjusting or setting the PLC modulation frequency based on the dither frequency. For example, processing unit 204 can include or interface with hardware components and circuitry such as, but not limited to, one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. In the embodiment shown in FIG. 2, a PLC frequency instructions 208 is stored on the memory 206 and executed by the processing unit 204.

When executed, the PLC frequency instructions 208 cause the processing unit 204 to calculate a PLC modulation frequency based on the dither frequency. For example, in some embodiments, the dither frequency is read from the memory 206. In other embodiments, the dither frequency is calculated based on the received dither angle signal, as described above. The processing unit 204 determines what frequency to use for the PLC modulation frequency based on the dither frequency. For example, in some implementations, the PLC modulation frequency is determined by multiplying the dither frequency by a constant value, as described above. After calculating the PLC modulation frequency, the processing unit 204 adjusts the frequency of a PLC pulse width modulator (PWM) 210. The PLC PWM 210 outputs a signal to the PLC control 212 based on the adjusted frequency. The PLC control 212 then converts the PWM signal from the PLC PWM 210 into a square wave voltage signal which is applied to the PZT coupled to each of the plurality of mirrors in the gyro block 10. The voltage signal causes the thickness of the PZT to increase or decrease and thereby adjust the path length in the gyro block 10, as described above.

The processing unit 204 also controls the duty cycle of a dither PWM 214 which outputs a signal to the dither control 216. The dither control 216 converts the PWM signal from the dither PWM 214 to a modulation voltage signal which is applied to at least one PZT coupled to a spoke as described above. The processing unit 204 also receives a signal indicative of the dither-induced angular rotation of the gyro block 10 from another transducer, as described above. Based on the received signal, the processing unit 204 calculates the dither frequency. Additionally, in some embodiments, the dither frequency is stored on memory 206 and retrieved by the processing unit 204. It is to be understood that the processing unit 204 can include other components not shown, such as an analog-to-digital converter (A/D) converter, used in carrying out the various functions of the processing unit 204.

Figure 3:
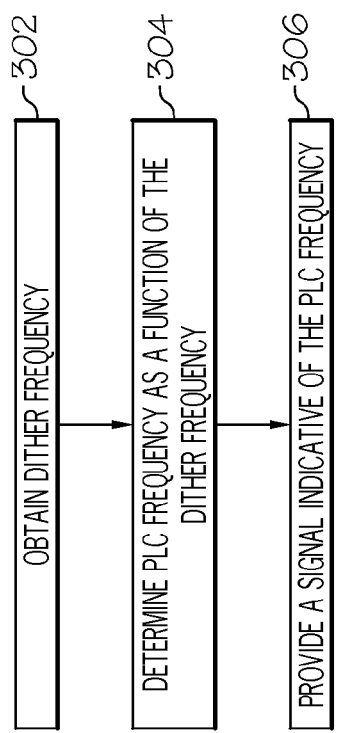
FIG. 3 is a flow chart of one embodiment of a method of controlling a path length control (PLC) modulation frequency of a gyroscope.

FIG. 3 is a flow chart depicting an exemplary embodiment of a method 300 of controlling a PLC modulation frequency of a gyroscope. Method 300 can be implemented by the gyro system 100 above. In particular, method 300 can be implemented, in some embodiments, by the processing unit 204 in the controller 202 above. At block 302, a dither frequency for the gyroscope is obtained. For example, in some embodiments, the dither frequency is calculated based on a signal received from a transducer coupled to the dither system. In other embodiments, the dither frequency is read from a memory such as an EEPROM.

At block 304, the PLC modulation frequency is determined based on the dither frequency. For example, in some embodiments, the PLC modulation frequency is determined based on a continuous function of the dither frequency. In particular, the continuous function can be a fixed multiple of the dither frequency. Additionally, the PLC modulation frequency can be updated periodically while the gyroscope is operating based on the dither frequency. Alternatively, the PLC modulation frequency can be determined once based on the dither frequency and not updated in real time while the gyroscope is operating. Furthermore, in an alternative embodiment, the PLC modulation frequency can be selected from a finite number of PLC modulation frequencies based on the dither frequency, as discussed above.

At block 306, a signal indicative of the PLC modulation frequency is provided to one or more mirror drives coupled to one or more mirrors, respectively. The signal controls the mirror drives to adjust the path length within the gyroscope. For example, the signal can be a direct current (DC) voltage signal which controls a piezoelectric transducer to change the position of the respective mirror, as discussed above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A gyroscope system comprising:
   a gyroscope block having a plurality of cavities and a plurality of passages that define a path;
   a plurality of mirrors each located in one of the plurality of cavities, each of the plurality of mirrors configured to direct light along the path defined by the plurality of cavities and the plurality of passages;
   at least one mirror drive coupled to one of the plurality of mirrors and configured to change a position of the respective mirror, wherein the path's length is changed by the change in the position of the respective mirror;
   a dither system coupled to the gyroscope block and configured to induce an angular rotation of the gyroscope block; and
   a controller configured to provide a dither signal indicative of a dither frequency to the dither system and a path length control (PLC) signal indicative of a PLC frequency to the at least one mirror drive;
   wherein the dither system is responsive to the dither signal to induce the angular rotation of the gyroscope block at the dither frequency;
   wherein the at least one mirror drive is responsive to the PLC signal to change the position of the respective mirror at the PLC frequency; and
   wherein the controller is configured to calculate the PLC frequency as a function of the dither frequency.

2. The gyroscope system of claim 1, wherein the controller is further configured to adjust the PLC frequency periodically based on changes in the dither frequency.

3. The gyroscope system of claim 1, wherein the controller is further configured to multiply the dither frequency by a fixed constant to calculate the PLC frequency.

4. The gyroscope system of claim 3, wherein the fixed constant is approximately 5.5.

5. The gyroscope system of claim 1, wherein the controller is further configured to calculate the PLC frequency as a continuous function of the dither frequency.

6. The gyroscope system of claim 1, wherein the controller is further configured to calculate the PLC frequency by selecting one of a plurality of PLC frequencies based on the dither frequency, wherein each of the plurality of PLC frequencies is associated with a respective dither frequency.

7. The gyroscope of claim 1, wherein the controller further comprises:
a memory having stored thereon PLC frequency instructions; and
a processing unit configured to execute the PLC frequency instructions, wherein the PLC frequency instructions cause the processing unit to calculate the PLC frequency as a function of the dither frequency.

8. The gyroscope of claim 7, wherein the processing unit is further configured to retrieve the dither frequency from the memory and to calculate the PLC frequency as a function of the dither frequency retrieved from the memory.

9. A method of controlling a path length control (PLC) modulation frequency of a gyroscope, the method comprising:
obtaining a dither frequency for the gyroscope;
determining the PLC modulation frequency based on the dither frequency; and
providing a signal indicative of the PLC modulation frequency to one or more mirror drives coupled to one or more mirrors of the gyroscope, wherein the one or more mirror drives adjusts the position of the respective one or more mirrors in response to the signal indicative of the PLC modulation frequency.

10. The method of claim 9, wherein obtaining the dither frequency comprises determining the dither frequency from a signal received from a transducer coupled to a dither system of the gyroscope.

11. The method of claim 9, wherein determining the PLC modulation frequency comprises multiplying the dither frequency by a fixed constant.

12. The method of claim 9, wherein determining the PLC modulation frequency comprises selecting one of a plurality of PLC frequencies based on the dither frequency, wherein each of the plurality of PLC frequencies is associated with a respective dither frequency.

13. The method of claim 9, wherein determining the PLC modulation frequency further comprises periodically updating the PLC modulation frequency based on changes in the dither frequency.

14. The method of claim 9, wherein obtaining the dither frequency comprises reading the dither frequency from a memory configured to store a value of the dither frequency.

15. A program product comprising a processor-readable medium on which program instructions are embodied, wherein the program instructions are configured, when executed by at least one programmable processor, to cause the programmable processor to:
obtain a dither frequency for a gyroscope;
calculate a PLC modulation frequency based on the dither frequency; and
provide a signal indicative of the PLC modulation frequency to one or more mirror drives coupled to one or more mirrors of the gyroscope, wherein the one or more mirror drives adjusts the position of the respective one or more mirrors in response to the signal indicative of the PLC modulation frequency.

16. The program product of claim 15, wherein the program instructions are further configured to cause the programmable processor to:
obtain the dither frequency by calculating the dither frequency from a signal received from a transducer coupled to a dither system of the gyroscope.

17. The program product of claim 15, wherein the program instructions are further configured to cause the programmable processor to:
determine the PLC modulation frequency by multiplying the dither frequency by a fixed constant.

18. The program product of claim 15, wherein the program instructions are further configured to cause the programmable processor to:
determine the PLC modulation frequency by selecting one of a plurality of PLC frequencies based on the dither frequency, wherein each of the plurality of PLC frequencies is associated with a respective dither frequency.

19. The program product of claim 15, wherein the program instructions are further configured to cause the programmable processor to:
periodically update the PLC modulation frequency based on changes in the dither frequency.

20. The program product of claim 15, wherein the program instructions are further configured to cause the programmable processor to:
read the dither frequency from a memory configured to store a value of the dither frequency.

* * * * *